(12) United States Patent
Beal et al.

(10) Patent No.: US 11,343,960 B2
(45) Date of Patent: May 31, 2022

(54) AGITATION UNITS AND SYSTEMS, AND DISPENSING EQUIPMENT EQUIPPED THEREWITH

(71) Applicant: Perma-Green Supreme, Inc., Valparaiso, IN (US)

(72) Inventors: Christopher Beal, Kenvil, NJ (US); Thomas F. Jessen, Valparaiso, IN (US)

(73) Assignee: Perma-Green Supreme, Inc., Valparaiso, IN (US)

( * ) Notice: Subject to any disclaimer, the term of this patent is extended or adjusted under 35 U.S.C. 154(b) by 101 days.

(21) Appl. No.: 16/711,973

(22) Filed: Dec. 12, 2019

(65) Prior Publication Data

US 2020/0113128 A1   Apr. 16, 2020

Related U.S. Application Data

(62) Division of application No. 15/692,711, filed on Aug. 31, 2017, now Pat. No. 10,582,656.

(60) Provisional application No. 62/385,531, filed on Sep. 9, 2016.

(51) Int. Cl.
*A01C 15/00* (2006.01)
*A01C 17/00* (2006.01)
*A01C 19/02* (2006.01)

(52) U.S. Cl.
CPC .......... *A01C 15/007* (2013.01); *A01C 15/001* (2013.01); *A01C 17/001* (2013.01); *A01C 17/005* (2013.01); *A01C 17/006* (2013.01); *A01C 19/02* (2013.01)

(58) Field of Classification Search
CPC ... A01C 15/007; A01C 17/001; A01C 17/005; A01C 17/006; A01C 15/001; A01C 19/02; A01C 17/00; A01C 17/008; E01C 19/203; E01C 19/20–205; E01C 2019/2055–2095; B05B 3/1007
USPC ....... 239/722, 650, 659, 668, 683, 687, 655, 239/664, 681, 689; 222/317, 473
See application file for complete search history.

(56) References Cited

U.S. PATENT DOCUMENTS 6,116,526 A * 9/2000 Bom ............... A01C 17/006
239/657

* cited by examiner

*Primary Examiner* — Qingzhang Zhou
*Assistant Examiner* — Juan C Barrera
(74) *Attorney, Agent, or Firm* — Hartman Global IP Law; Gary M. Hartman; Domenica N. S. Hartman

(57) ABSTRACT

An agitation unit for use in a lawn spreader and other dispensing equipment, and oscillating agitation systems therefor comprising such an agitation unit. The agitation unit includes a hub, an arm extending from the hub, and an extension on the arm configured to project downwardly to an extent relative to the arm and the hub to protrude into, but not through, the outlet passageway of the hopper.

10 Claims, 11 Drawing Sheets

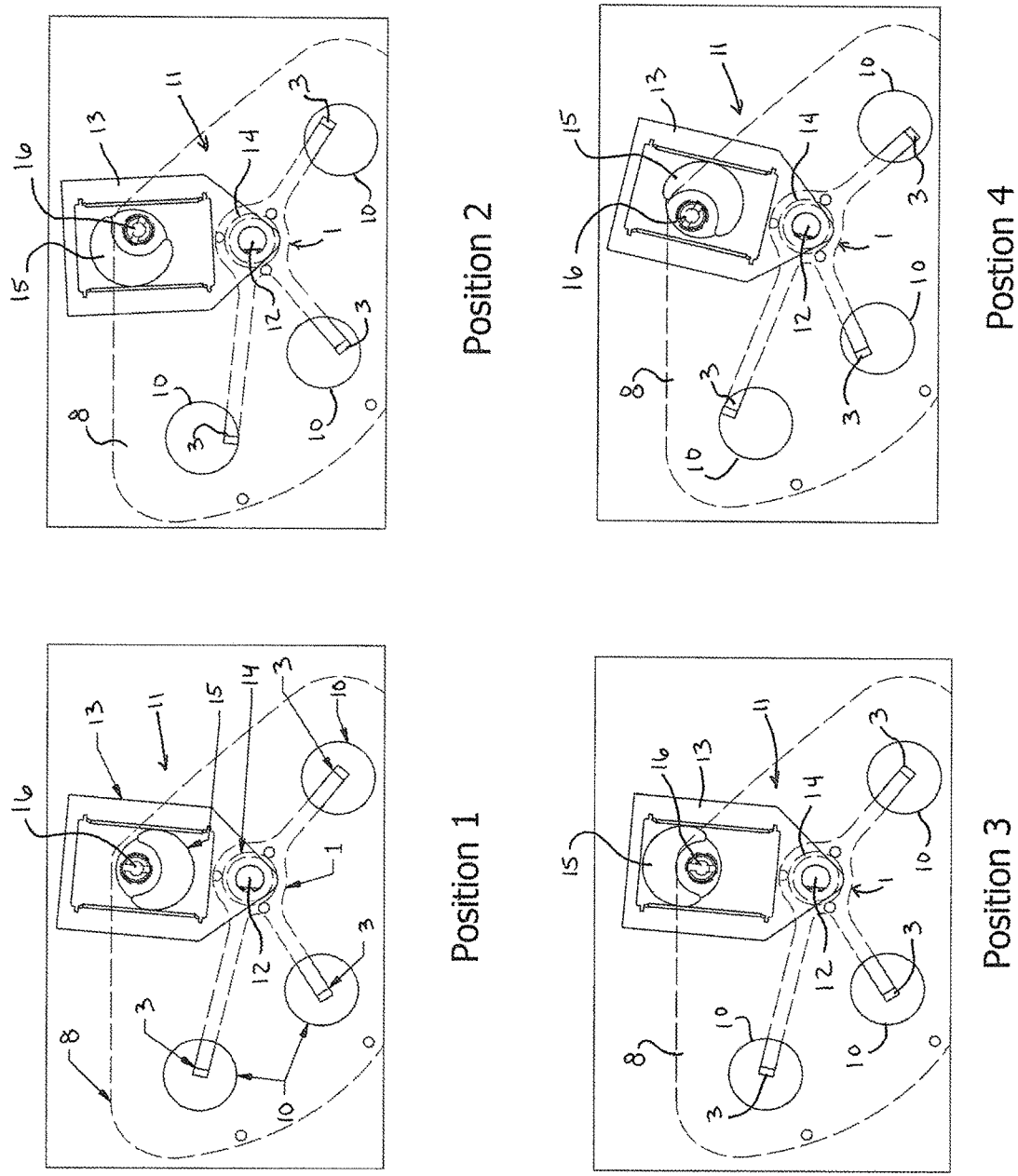

AGITATION UNITS AND SYSTEMS, AND DISPENSING EQUIPMENT EQUIPPED THEREWITH

CROSS REFERENCE TO RELATED APPLICATIONS

This is a division patent application of co-pending U.S. patent application Ser. No. 15/692,711 filed Aug. 31, 2017, which claims the benefit of U.S. Provisional Application No. 62/385,531, filed Sep. 9, 2016. The contents of these prior applications are incorporated herein by reference.

BACKGROUND OF THE INVENTION

The present invention generally relates to equipment for dispensing dry solid particles, and to agitation systems therefor. More particularly, the present invention relates to agitation units and systems capable of use in broadcast spreaders and other dispensing equipment.

Broadcast spreaders encompass a variety of dispensing equipment that are commonly used to spread (broadcast) dry particulate or granular materials, nonlimiting examples of which include fertilizers and seeds. As a matter of convenience, these and other types of dry particulate and granular materials will hereinafter be simply referred to as granular materials. Common types of broadcast spreaders comprise a hopper having one or more outlet passageways through which the granular material drops from the hopper onto a dispersion impeller (platter) located beneath the hopper. The impeller is rotated so that material dropped onto its upper surface is spread on surfaces surrounding the spreader. Due to the presence of a rotating impeller to broadcast the granular material, such spreaders are commonly referred to as rotary spreaders and are capable of broadcasting a wide variety of granular materials. Notable examples of rotary spreaders include those described in U.S. Pat. Nos. 6,336,600 and 7,954,573, PermaGreen® Ride-On Spreader Sprayers commercially available from Perma-Green Supreme, Inc., and LESCO® brand spreaders commercially available from various retail outlets.

Oscillating agitation systems and rotary agitation systems are well known and commercially available for rotary spreaders. For example, U.S. Pat. No. 280,437 to Armstrong discloses a downwardly-extending horizontally-rotating agitator arm that passes in close proximity to an outlet passageway of a hopper through which a dry granular material drops from the hopper onto a spinning platter. Another example is described in U.S. Pat. No. 3,406,915 to Dweyer, which discloses an agitation unit with extensions that extend downward, passing close to but not entering an outlet passageway in a hopper.

While providing a level of agitation above outlet passageways, the agitators noted above have well known shortcomings. For example, fertilizer is hydroscopic and absorbs moisture from the air causing it to stick together and form clumps that clog or bridge over the passageways below the agitator extensions and within the outlet passageways themselves. Furthermore, during agitation all agitators abrade the material being agitated and create a fine dust that may further aggravate bridging and clogging problems within the outlet passageways of the hopper. A partially bridged or completely clogged outlet passageway causes an uneven output and application of the material causing unsightly results. Furthermore, once clogged the hopper may have to be emptied to clear the clog, consuming valuable time.

Rotary agitators have additional well-known problems resulting from the agitator extension traveling in a complete circular path, such that the extension contacts more of the granular material and is likely to cause more abrasion of the material than occurs with oscillating agitators. As a result, rotary agitators tend to produce more fine dust and small particles that can build up within the outlet passageways of a hopper.

It should be clear from the above description that it would be desirable if an agitation system were available that was capable of reducing clogging of a dry granular material being dispensed by a device and thereby promote flow-through of the material.

BRIEF DESCRIPTION OF THE INVENTION

The present invention provides agitation units and systems equipped with one or more agitator arms capable of reducing clogging of a dry granular material being dispensed by dispensing equipment, and to dispensing equipment equipped with such agitation units and systems.

According to one aspect of the invention, an agitation unit is configured for use in dispensing equipment comprising a hopper, an impeller located beneath the hopper and operable to spread a dry granular material deposited on an upper surface thereof, an outlet passageway in the hopper through which the granular material drops from the hopper onto the impeller, a rotating shaft, and an oscillating agitation system having a cam on the rotating shaft. The agitation unit includes a hub, an arm extending from the hub, and an extension on the arm configured to project downwardly to an extent relative to the arm and the hub to protrude into, but not through, the outlet passageway of the hopper.

According to another aspect of the invention, an oscillating agitation system is configured for use in dispensing equipment comprising a hopper, an impeller located beneath the hopper and operable to spread a dry granular material deposited on an upper surface thereof, an outlet passageway in the hopper through which the granular material drops from the hopper onto the impeller, and a rotating shaft. The oscillating agitation system includes a cam on the rotating shaft, and an agitation unit comprising a hub, an arm extending from the hub, and an extension of the arm configured to project downwardly to an extent relative to the arm and the hub to protrude into, but not through, the outlet passageway of the hopper. A coupling unit couples the arm to the cam and converts a rotational motion of the cam into motion of the extension within the outlet passageway.

Other aspects of the invention include dispensing equipment equipped with agitation units and oscillating agitation systems as described above, and retrofit kits comprising elements of the agitation units and oscillating agitation systems described above.

Technical aspects of the oscillating agitation units and systems described above preferably include the ability to reduce abrasion of dry granular materials in the vicinity of an outlet passageway through which the materials must pass. Such oscillating agitation units and systems are also preferably capable of use on a variety of dispensing equipment, including but not limited to rotary spreaders such as power-driven ride-on spreaders, power-driven walk-behind spreaders, push-type spreaders, and spreaders mounted on other vehicles. It is envisioned that the oscillating agitation units and systems could also improve other devices that transfer or convey a dry granular material and would benefit from agitation within an outlet passageway through which the material must pass.

Other aspects and advantages of this invention will be better appreciated from the following detailed description.

BRIEF DESCRIPTION OF THE DRAWINGS

FIG. 3 contains four images that depict views from beneath a hopper in which the agitation unit of FIG. 1A is installed, and show the procession (Positions 1 through 4) of the agitation unit in action as a result of being coupled to an oscillating means.

DETAILED DESCRIPTION OF THE INVENTION

Figure 1A:
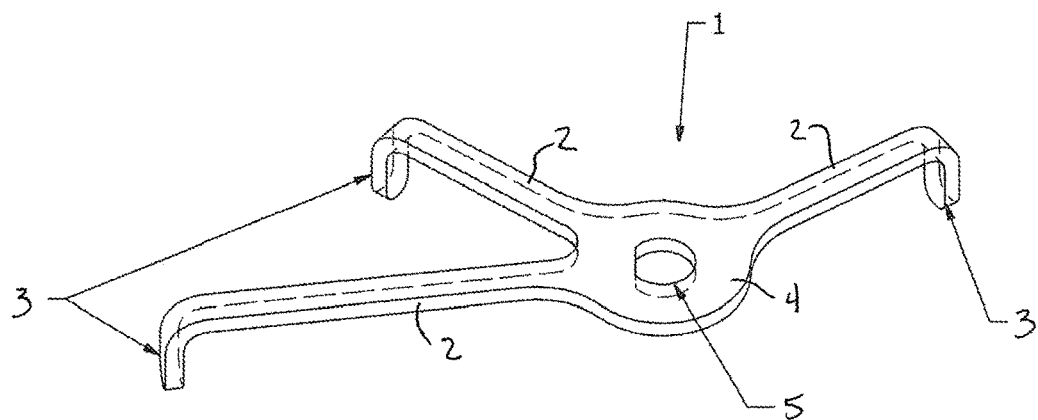
FIGS. 1A and 1B represent two embodiments of agitation units configured for installation in a hopper of dispensing equipment adapted to broadcast a dry granular material.

The drawings depict various embodiments of agitation units 1 configured to be used in place of, or to replace, an original equipment agitation unit on a variety of conventional and commercially available rotary spreaders equipped with oscillating agitation systems. Particular but nonlimiting examples of spreaders with conventional oscillating agitation systems that fall within the scope of this invention are the PermaGreen® Ride-On Triumph, Magnum, and Ultra; LESCO® BRAND spreaders, including but not limited to the Truckster 12-volt powered spreader, the HPS ride-on spreader, the Chariot ride-on spreader sprayer, the 80-pound rotary push type walk-behind spreader; and LESCO brand spreaders installed on other equipment produced by other manufacturers, such as certain LT Rich brand spreaders and spreader sprayers.

To facilitate the description provided below of the embodiments represented in the drawings, relative terms, including but not limited to, "vertical," "horizontal," "lateral," "front," "rear," "side," "forward," "rearward," "upward," "downward," "above," "below," "right," "left," etc., may be used in reference to the perspective of an operator during the operation of a machine on which the invention is installed, and therefore are relative terms that are useful to describe installations of the invention but should not be otherwise interpreted as limiting the scope of the invention. For convenience, consistent reference numbers are used throughout the drawings to identify the same or functionally related or equivalent elements.

Figure 1B:
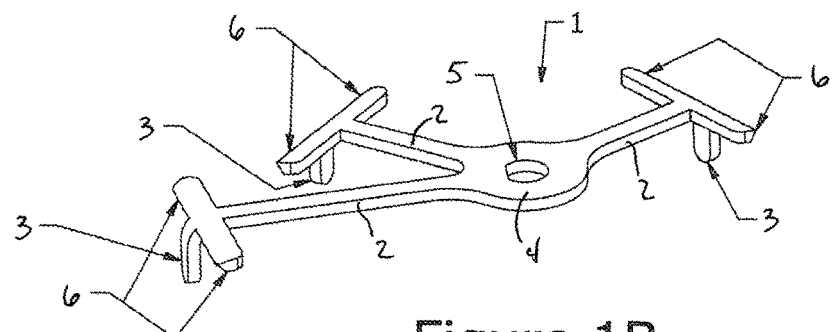

Two embodiments of agitation units 1 are schematically represented in FIGS. 1A and 1B. Each unit 1 is generally configured to have a generally horizontal orientation when installed in a hopper of a rotary spreader (not shown). Each unit 1 is a unitary, one-piece article having multiple arms 2, each extending in a generally radial direction from a hub 4 of the unit 1. Each arm 2 has an extension 3 that extends downward to an extent relative to the arm 2 and hub 4 to be able to protrude into one of a corresponding number of outlet passageways (not shown) of the hopper in which the unit 1 is installed. Each hub 4 is formed to have a D-shaped hole 5 to enable the unit 1 to be mated with and suitably affixed to a complementary D-shaped shaft of a conventional oscillating means (not shown). The complementary D-shapes of the hole 5 and shaft serve to align the downwardly-projecting extensions 3 so as to protrude into the outlet passageways and prevent the agitation unit 1 from rotating on the shaft. It should be apparent that the positions of the arms 2 may be adjusted in a nonlimiting way by bending in relationship with the hub 4 and the outlet passageways. The unit 1 of FIG. 1B is further equipped with opposing pairs of additional extensions 6 that extend perpendicularly from each arm 2 to increase agitation beyond the entrances of the outlet passageways. It should be apparent that the positions of the extensions 3 and 6 may be adjusted in a nonlimiting way by bending the extensions 3 and 6 relative to the arms 2.

Figure 2:
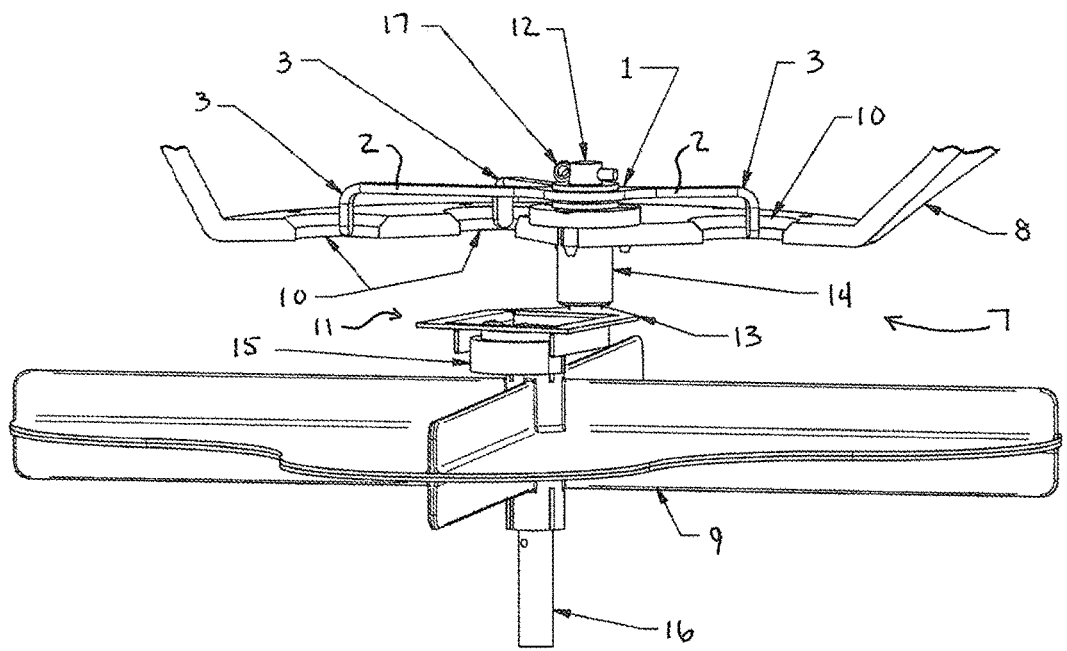
FIG. 2 is a schematic cross-sectional view of a hopper in which the agitation unit of FIG. 1A is installed and attached to a conventional oscillating means.

FIG. 2 shows the agitation unit 1 of FIG. 1A operably affixed to a known cam coupling unit 11 installed in a hopper 8 (shown in partially cross-section) of a rotary spreader. The spreader is equipped with an impeller (platter) 9 that is rotated by a drive shaft 16, and the cam coupling unit 11 couples the agitation unit 1 to a cam 15 mounted on the shaft 16. In combination, the agitation unit 1, cam coupling unit 11, and cam 15 constitute an oscillating agitation system 7 of the spreader. The hopper 8 is represented as having three outlet passageways 10 in its bottom wall (floor) through which a granular material within the hopper 8 is able to drop onto the impeller 9, such that rotation of the impeller 9 causes the material deposited thereon to be broadcast onto surfaces surrounding the spreader. A metering plate (not shown) may be mounted below the hopper 8 to control the flow of dry granular material through the outlet passageways 10. The agitation unit 1 is mounted with the cam coupling unit 11 so that its downwardly projecting extensions 3 protrude into, but not through, the outlet passageways 10. In the nonlimiting embodiment shown, the unit 1 is operably affixed by means of a cotter pin 17 to a D-shaped portion of a cam follower shaft 12, which along with a cam follower 13 forms the cam coupling unit 11. The cam follower shaft 12 rotatably passes through the hopper 8 by means of a suitable bearing 14 molded into the hopper 8 or affixed to the hopper 8, for example, by means of screws (not shown). The cam 15 is suitably coupled to the drive shaft 16 of the impeller 9 for rotation therewith, and is in operable communication with the cam follower 13 so that rotation of the cam 15 causes the cam coupling unit 11 to oscillate.

Positions 1, 2, 3, and 4 of FIG. 3 depict the progression of the action of the agitation unit 1 caused by one revolution of the rotating cam 15. As the cam 15 (and drive shaft 16) rotates clockwise, the cam follower 13 converts the rotational input of the cam 15 into counter-clockwise (Position 2) and clockwise (Position 4) oscillations of the cam follower 13 about the axis of the cam follower shaft 12, which is able to rotate within the bearing 14 but is otherwise fixed with respect to the hopper 8. The cam follower shaft 12 transmits the oscillating motion to the agitation unit 1 and its arms 2, whose extensions 3 protrude into but not through the outlet passageways 10 of the hopper 8. As a result, the extensions 3 also oscillate in counter-clockwise (Position 2) and clockwise (Position 4) directions about the axis of the cam follower shaft 12 to break up any clogs or bridging of the material in the vicinity of the entrances of the passageways 10 and within the passageways 10, thereby promoting the flow of the granular material into and through the passageways 10.

FIGS. 4A through 4F illustrate various embodiments of means by which agitation units 1 of the present invention may be suitably and operably affixed to shafts of cam coupling units 11 of various rotary spreaders equipped with oscillating agitation systems. In each case, the affixing means serves to prevent the rotation of agitation unit 1 on the shaft 12 of the cam coupling unit 11 and align the downwardly-projecting extensions 3 of the unit 1 with the outlet passageways (not shown) of a hopper in which the unit 1 is installed.

Figure 4A:
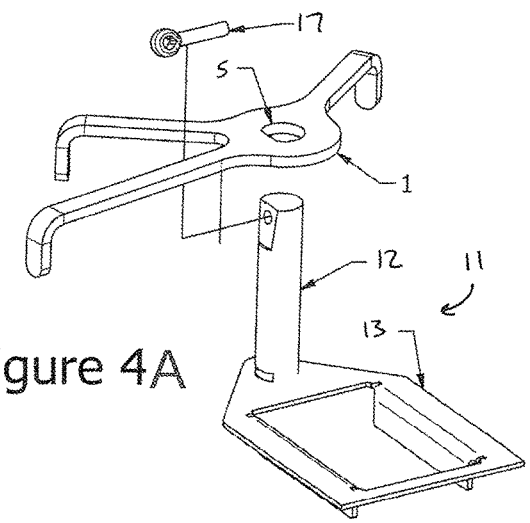
FIGS. 4A through 4F schematically represent alternative means for affixing the agitation unit of FIG. 1A to a cam coupling unit of various oscillating agitation systems.

The cam follower shaft 12 of FIG. 4A exemplifies a cam coupling unit 11 of a type used on certain PermaGreen® equipment. A D-shaped portion of the cam follower shaft 12 is aligned for insertion into a D-shaped hole 5 of the agitation unit 1 of FIG. 1A, after which the unit 1 can be affixed to the shaft 12 with a cotter pin 17 inserted in a hole drilled in the shaft 12.

Figure 4B:
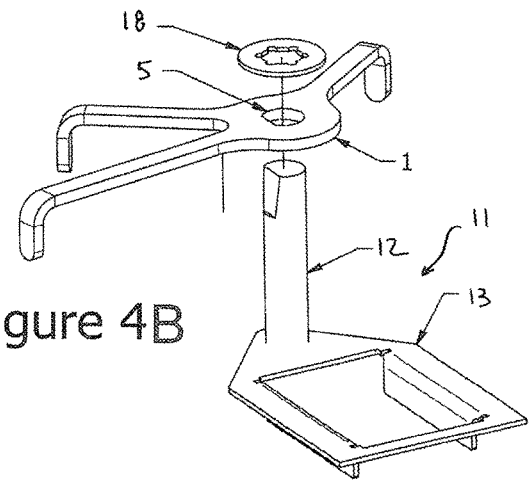

The cam follower shaft 12 of FIG. 4B exemplifies a cam coupling unit 11 of a type used on certain LESCO® equipment. A D-shaped portion of the cam follower shaft 12 is aligned for insertion into a D-shaped hole 5 of the agitation unit 1 of FIG. 1A, after which the unit 1 can be affixed to the shaft 12 with a push nut 18 forced onto the shaft 12.

Figure 4C:
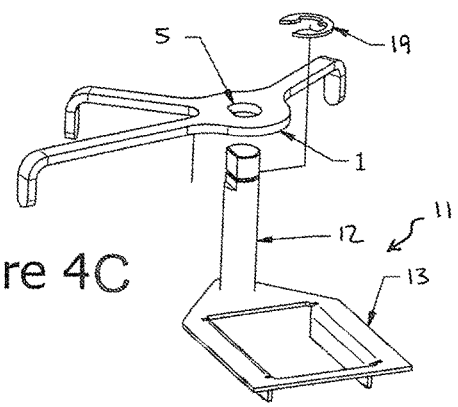

The cam follower shaft 12 of FIG. 4C exemplifies a cam coupling unit 11 of a type used on certain other LESCO® equipment. A D-shaped portion of the cam follower shaft 12 is aligned for insertion into a D-shaped hole 5 of the agitation unit 1 of FIG. 1A, after which the unit 1 can be affixed to the shaft 12 with an external retaining ring 19 forced into a groove formed in the circumference of the shaft 12.

Figure 4D:
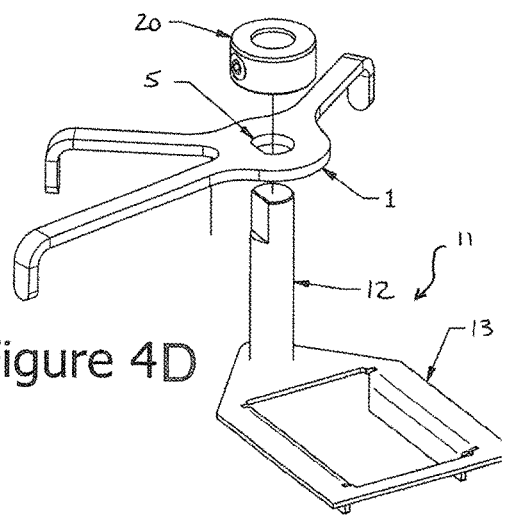
Figure 4E:
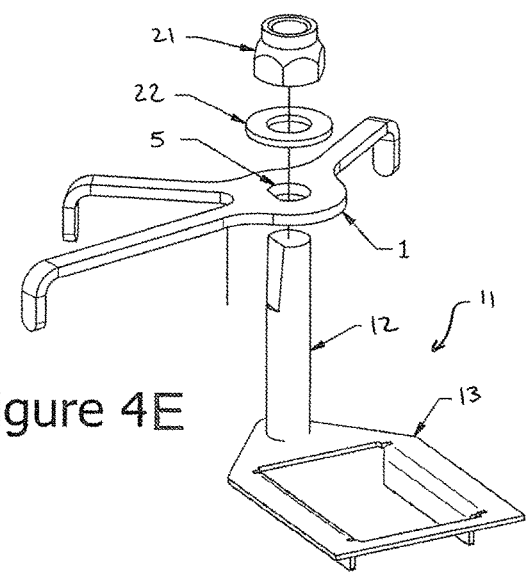

The cam follower shafts 12 of FIGS. 4D and 4E exemplify cam coupling units 11 of other types known in the industry. In both embodiments, a D-shaped portion of the cam follower shaft 12 is aligned for insertion into a D-shaped hole 5 of the agitation unit 1 of FIG. 1A, after which the unit 1 is affixed to the shaft 12. In FIG. 4D, the unit 1 is affixed with a shaft collar 20 that may be attached to the agitation unit 1 by any suitable means (for example, metallurgically (such as resistance welding) or mechanically), enabling the unit 1 to be secured to the shaft 12 by means of a set screw in the shaft collar 20 (not shown). In FIG. 4E, the unit 1 is affixed to the shaft 12 with a nut 21 and lock washer 22, the former of which is threaded onto a threaded portion (not shown) of the shaft 12.

Figure 4F:
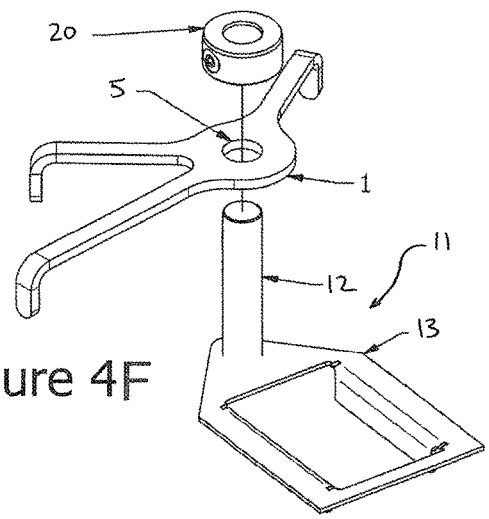

In a preferred embodiment, the cam follower shaft 12 of FIG. 4F exemplifies a cam coupling unit 11 of still another type known in the industry. The cam follower shaft 12 is again shown as aligned for insertion into the hole 5 of the agitation unit 1 of FIG. 1A. However, the hole 5 and the portion of the shaft 12 received in the hole 5 have complementary circular shapes. Similar to the embodiment of FIG. 4D, the unit 1 is then affixed to the shaft 12 with a shaft collar 20 that may be attached to the agitation unit 1 by any suitable means (for example, resistance welding), enabling the unit 1 to be secured to the shaft 12 with a setscrew (not shown). It is foreseeable that the unit 1 of FIG. 4F could be similarly installed on one of the other shafts 12 represented in FIGS. 4A through 4E.

The agitation units 1 shown in FIGS. 1, 2, 3, and 4A through 4F are unitary, one-piece articles having multiple arms 2 that extend in generally radial directions from the hub 4 of the unit 1. In the case of FIGS. 4D and 4F, the agitations units 1 and the collars 20 affixed thereto can also be viewed as unitary, one-piece articles. The present invention encompasses other configurations of agitation units 1 including units 1 whose arms 2 may be adjustable, movable, replaceable, and/or installed after the unit 1 is installed on a hopper 8, as described below in reference to FIGS. 5 and 6.

Figure 5:
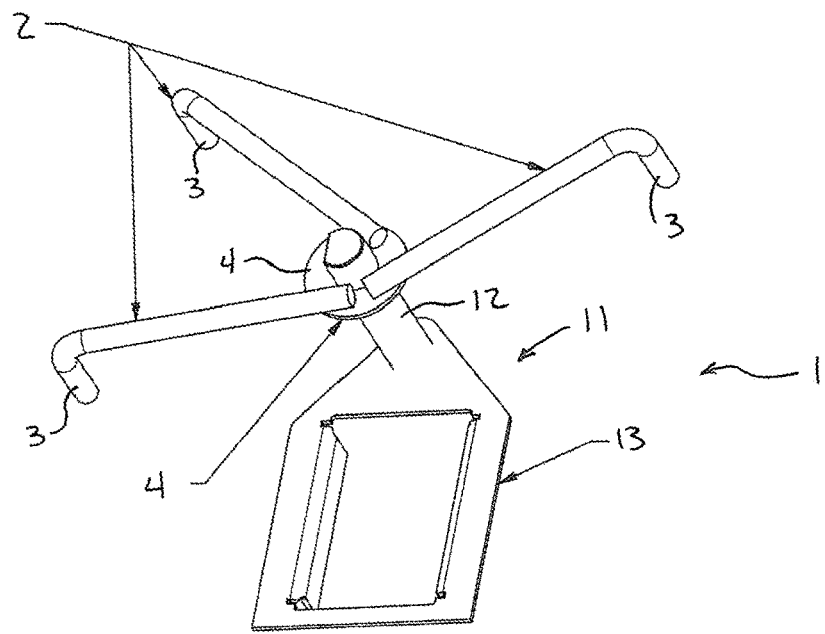
FIG. 5 represents an embodiment of an agitation unit comprising arms formed of bent rods that are metallurgically attached to a hub of the unit.

FIG. 5 schematically represents an agitation unit 1 whose arms 2 are formed of wires attached to the hub 4 of the unit 1 and having extensions 3 that are bent downward to an extent relative to the arms 2 and hub 4 in order to protrude into the outlet passageways of a hopper (not shown). The hub 4 has a D-shaped hole in which a complementary-shaped portion of a cam follower shaft 12 is received and secured, for example, as depicted in FIGS. 4A through 4E. The arms 2 are not integral extensions of the hub 4, but instead are shown as metallurgically attached to the hub 4. In addition, the arms 2 extend outward from the hub 4, but may not lie on radials of the hub 4 (i.e., radials relative to the axis of the cam follower shaft 12). It should be apparent that while the arms 2 are shown as separate pieces of wire, the arms 2 may be formed by one or two wires so long as the wire form defines extensions 3 that extend downward to an extent relative to the arms 2 and hub 4 so that they protrude into, but not through, the outlet passageways.

Figure 6:
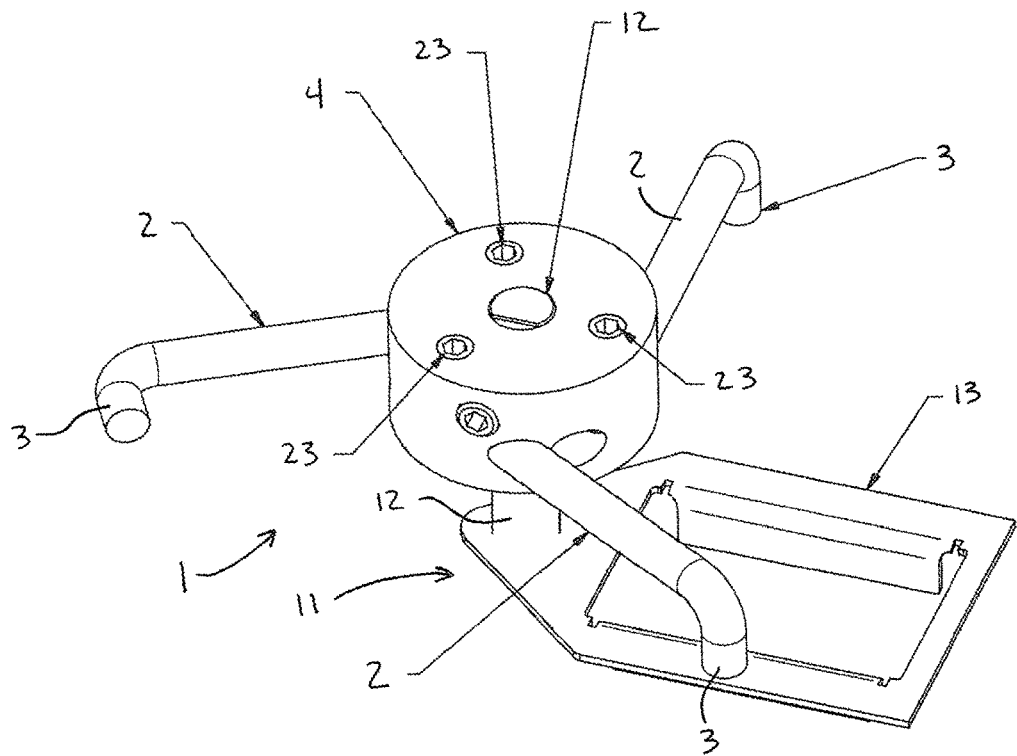
FIG. 6 represents an embodiment of an agitation unit comprising removable, replaceable, and repositionable arms connected to a hub of the unit.

FIG. 6 schematically represents an agitation unit 1 whose arms 2 are formed of bent wires, but are not integral extensions of the hub 4 or metallurgically attached to the hub 4. Instead, the arms 2 are removable, replaceable, and repositionable by means of setscrews 23. The distal ends of two of the extensions 3 are shown as selectively projecting downward to protrude into an outlet passageway of a hopper (not shown), whereas the distal end of the third extension 3 is shown pointing horizontally so as not to protrude into an outlet passageway of the hopper. The unit 1 is represented as being secured to the cam follower shaft 12 in a manner similar to what was described for FIGS. 4D and 4F, though other affixing means are foreseeable.

Figure 7:
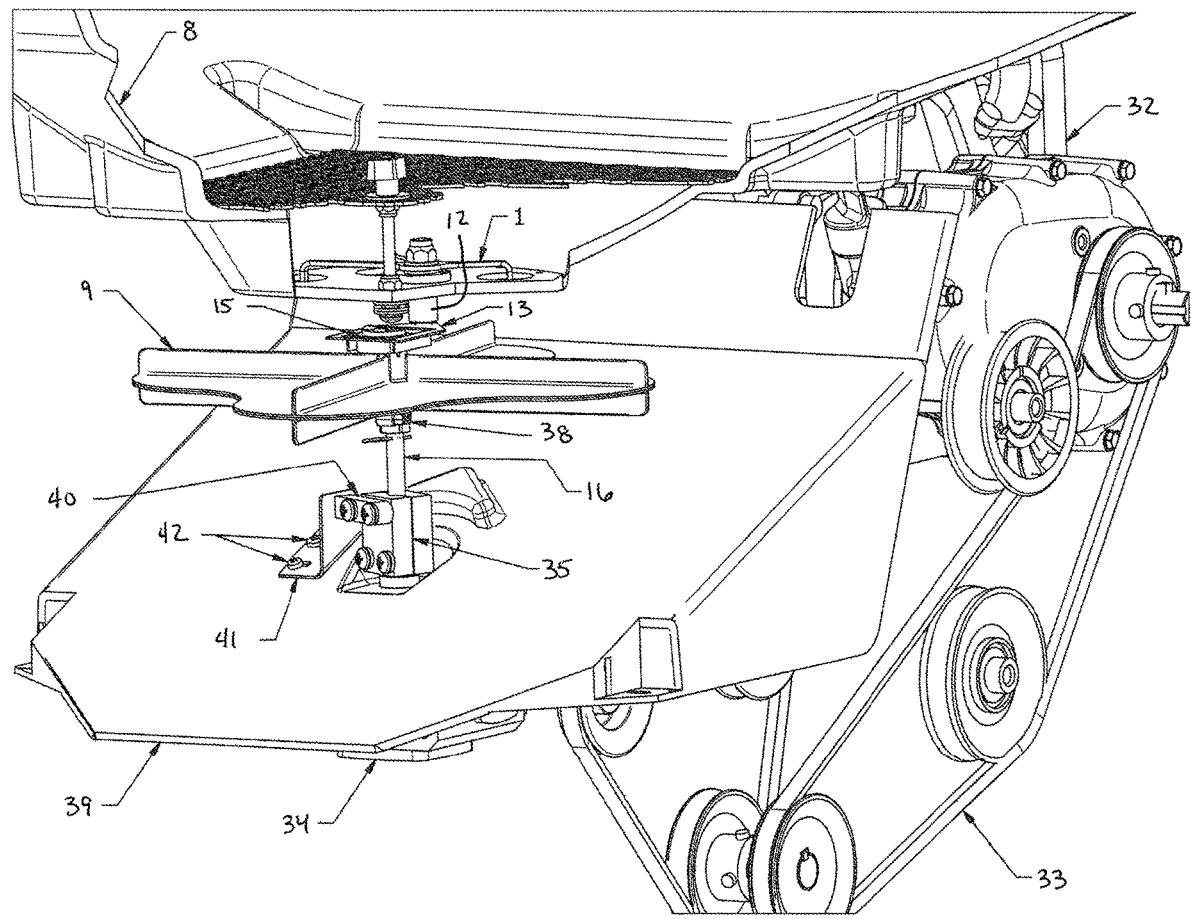
FIG. 7 is a schematic perspective view of the agitation unit of FIGS. 1A, 2, 3, and 4 installed on a rotary spreader equipped as part of an oscillating agitation system.

The agitation units 1 described above are well suited for replacing conventional and original equipment agitators found on commercially available rotary spreaders equipped with oscillating agitation systems. FIG. 7 shows the agitation unit 1 and cam coupling unit 11 (comprising the cam follower shaft 12 and cam follower 13) of FIG. 4E installed as components of an oscillating agitation system installed on a PermaGreen® Triumph Spreader Sprayer, aspects of which are disclosed in U.S. Pat. Nos. 6,336,600 and 7,954,573. FIGS. 7 through 10 show the agitation unit 1, cam coupling unit 11, and other associated components of the Triumph Spreader Sprayer, which, as a matter of convenience, will be simply referred to as the "spreader" in reference to FIGS. 7 through 10. A gasoline motor 32 with centrifugal wet clutch is operably connected to a drive system 33 that includes belts and pulleys operably in communication with a right angle gearbox 34, pump (not shown), and transmission (not shown). A coupler block 35 operably connects the output shaft of the right angle gearbox 34 to a rotating shaft, corresponding to the drive shaft 16 described in reference to FIGS. 2 and 3. A double sided impeller, corresponding to the impeller 9 described in reference to FIG. 2, is operably attached to the drive shaft 16 by a clamp 38 to rotationally distribute a dry granular material, for example, fertilizer, in a wide and even pattern as the impeller 9 revolves. The cam 15 is operably affixed to the drive shaft 16 by means of screws (not shown) and is in operable communication with the cam follower 13 of the cam coupling unit 11. The hopper 8 contains the granular material to be spread. Further illustrated is that the output shaft of the right angle gearbox 34 passes through a hood 39 that covers some working parts of the machine. A striker cam 40 is affixed to the coupler block 35. As the drive shaft 16 rotates, the striker cam 40 contacts a striker plate 41 affixed to the hood 39, for example, by screws 42, thereby causing the hood 39 to oscillate to reduce material build up.

Figure 8:
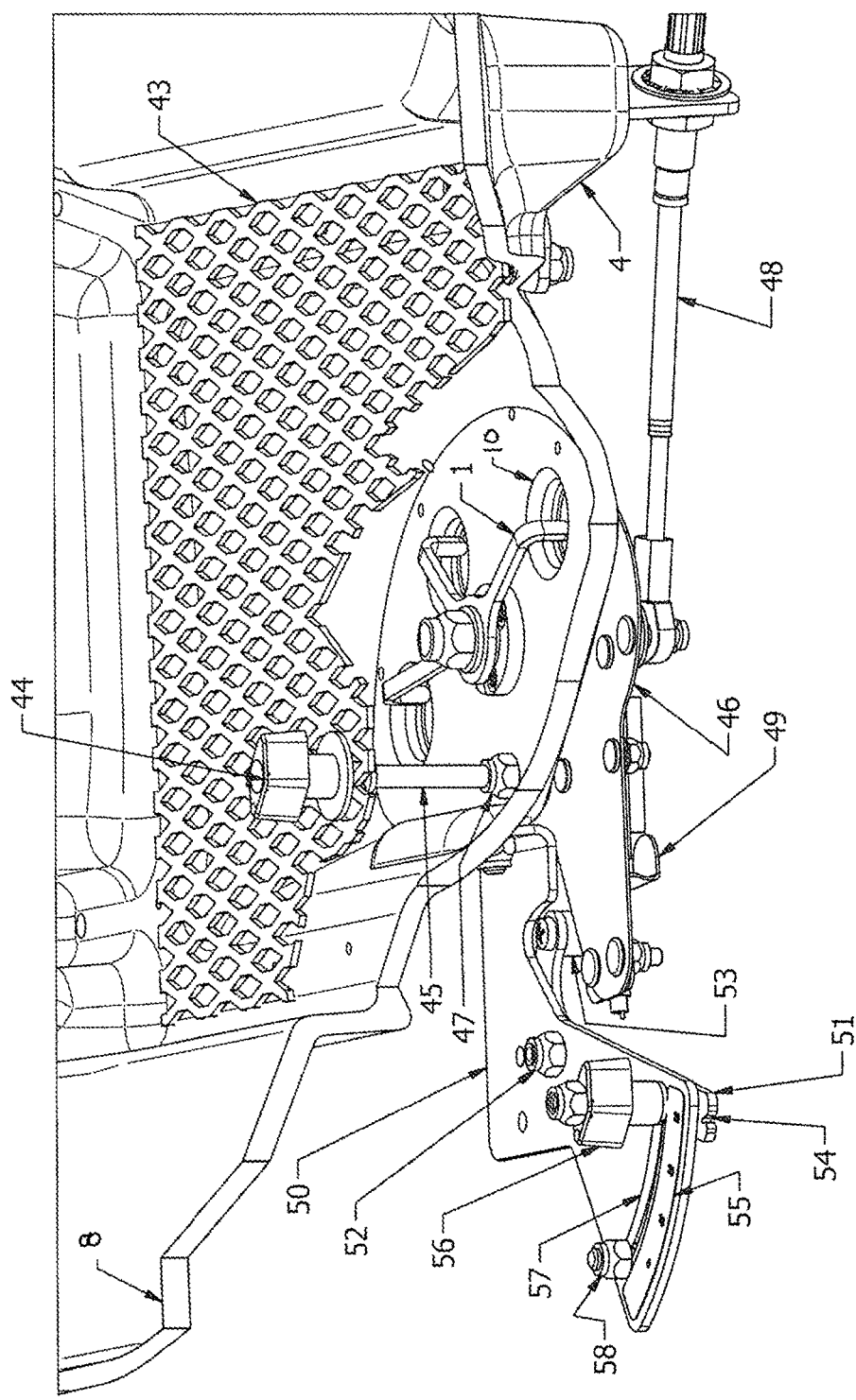
FIG. 8 schematically represents the hopper of the spreader of FIG. 7 further equipped with a rate adjuster adapted to establish different flow rates of granular material corresponding to different ground speeds of the spreader.
Figure 10:
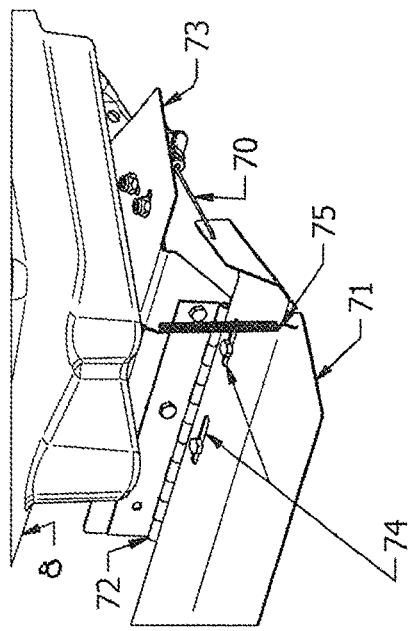
FIG. 10 schematically represents an adjustable deflector operable in combination with the rate adjuster of FIG. 8 and the control system of FIG. 9 to selectively shunt the granular material pattern away from areas where granular material is unwanted.

FIG. 8 shows another view of the agitation unit 1 and oscillating agitation system of FIG. 7, but modified to include means for establishing different flow rates of granular material for different ground speeds of the spreader. A screen 43 provided to filter out large particles has a knob 44 attached by means of, for example, a lanyard (not show). A screen bolt 45 passes through one of the openings in the screen 43 and is secured thereto by the knob 44. The opposite end of the screen bolt 45 passes through a bearing of an ON/OFF metering plate 46, passes through the bottom wall of the hopper 8, and is secured thereto with a nut 47. As such, the ON/OFF metering plate 46 is pivotally affixed to the hopper 8 by the screen bolt 45, and serves as means for establishing different flow rates of granular material through the outlet passages 10 of the hopper 8. The ON/OFF metering plate 46 may be loosely supported from the bottom wall of the hopper 8 by washers and screws (not shown). A push-pull rate control cable 48 is operably connected to the ON/OFF metering plate 46 for remote actuation by a rate control arm assembly 60 shown in FIG. 9. The rate control arm assembly 60 is located at a position (hereinafter, "operator's position") accessible by an operator of the spreader. A hole pattern balance adjuster 49 is slidably affixed to the ON/OFF metering plate 46. A push-pull cable and lever (not shown) provide remote operation of the pattern balance adjuster 49 from the operator's position. A first rate adjuster plate 50 is affixed to the hopper 8. A rate adjuster arm 51 is pivotally mounted to the first rate adjuster plate 50 by a pivot bolt and nut assembly 52. A rate adjuster cam 53 is affixed to one end of the rate adjuster arm 51 and contacts the ON/OFF metering plate 46 to limit the opening of the ON/OFF metering plate 46 to a desired discharge of granular material for a specific ground speed of the spreader, preferably its fastest speed of operation (referred hereafter as the High Speed Calibrated Setting). The opposite end of the rate adjuster arm 51 has an indicator notch 54 that locates a specific setting on a first label rate gauge 55 affixed to the first rate adjuster plate 50. Once the High Speed Calibrated Setting is determined, the rate adjuster arm 51 is locked into position by means of a first knob and bolt assembly 56 that passes through the rate adjuster arm 51 and through an arc-shaped slot 57 in the first rate adjuster plate 50. A limit nut and screw 58 is then moved into operable contact with the first knob and bolt and assembly (56) rate adjuster and tightened. The first knob and bolt assembly 56 can now be loosened and the rate adjuster arm 51 may be rotated to provide a larger opening in the ON/OFF metering plate 46 to permit cleaning and then conveniently returned into contact with the limit nut and screw assembly 58 to precisely return to the High Speed Calibrated Setting.

Figure 9:
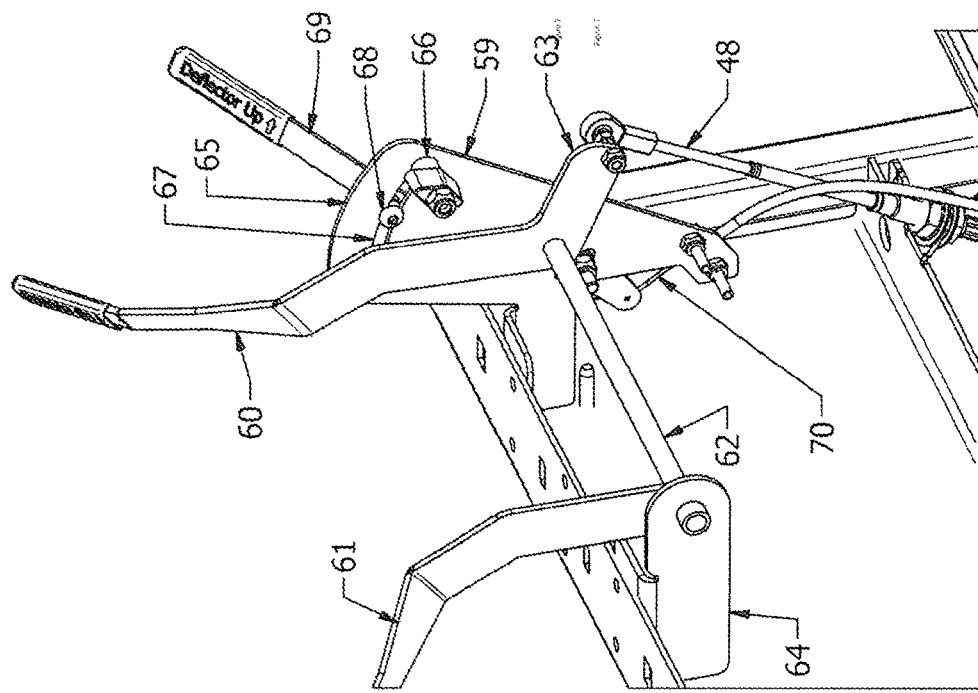
FIG. 9 schematically represents a control system for adjustably remotely operating the rate adjuster of FIG. 8 to enable the adjuster to be preset at any one of the different flow rates.

FIG. 9 shows a second rate adjuster plate 59 located at the operator's position. A rate control arm assembly 60 comprising a weldment of a righthand rate control arm 61, a pivot rod 62, and a lefthand rate control arm 63 is operably connected to the ON/OFF metering plate 46 by means of a rate control cable 48. The rate control arm assembly 60 is pivotably mounted to a right pivot plate 64 and the second rate adjuster plate 59 with bearings (not shown). Moving the rate control arm assembly 60 forward and rearward respectively increases and decreases the opening between the ON/OFF metering plate 46 and the outlet passageways 10 of the hopper 8 (FIG. 8) to permit more or less granular material to flow from the hopper 8. The passageways 10 are closed when the rate control arm assembly 60 is in the rearmost position. A second label rate gauge 65 is affixed to the second rate adjuster plate 59. The rate control arm assembly 60 is positioned to limit the opening of the ON/OFF metering plate 46 to the desired discharge of granular material for a specific ground speed of the spreader that is desired for the slowest speed of operation (referred hereafter as the Low Speed Calibrated Setting). Once the Low Speed Calibrated Setting is located its position is set by means of a second knob and bolt assembly 66 that passes through a second arc-shaped slot 67 in the second rate adjuster plate 59 that limits the forward motion of the rate control arm assembly 60. A second limiting nut and screw 68 is then moved into operable contact with the knob and bolt assembly 66 and tightened to locate the Low Speed Calibrated Setting. The knob and bolt assembly 66 can then be loosened and pushed forward and tightened beyond the point of where the rate adjuster cam 53 of the rate adjuster arm 51 stops the movement of the ON/OFF metering plate 46 at the High Speed Calibrated Setting. The left hand rate control arm 63 passes over the limiting nut and screw 68. It should be noted that the operator may change from High Speed to Low Speed Calibrated Settings by selectively repositioning the knob and bolt assembly 66 while at the operator's position. A deflector lever 69 is operably connected to a push-pull deflector cable 70, the opposite end of which is operably connected to a deflector 71 shown in FIG. 10.

The deflector 71 may be selectively pivotally lowered to block granular material from being broadcast beyond the spreader. A hinge 72 operably and pivotally connects the deflector 71 to a suitable bracket 73 that is attached to the hopper 8. Adjustment slots 74 are provided to move the deflector 71 forward to reduce, and rearward to increase, the amount of granular material spread beyond the lateral perimeter of the spreader. A spring 75 assists in lifting the deflector up and out of the way of the granular material being dispensed. The deflector cable 70 is in operable communication with the deflector 71, which is selectively raised and lowered by means of actuating the deflector lever 69 (FIG. 9).

Though the agitation units 1 described above are well suited for replacing conventional and original equipment agitators found on commercially-available rotary spreaders equipped with oscillating agitation systems, the present invention also encompasses retrofit kits for converting conventional rotary spreaders with or without rotary agitation systems to an oscillating agitation system that may utilize any of the agitation units 1 described above, as well as additional embodiments of agitation units within the scope of the invention. Particular but nonlimiting examples include such spreader brands as SPYKER®, EARTHWAY®, PRIZELAWN®, TURFEX®, SCOTTS®, and other spreaders and spreader sprayers that utilize their fertilizer hoppers, such as LT Rich, Turco, TORO®, EXMARK®, and GROUND LOGIC®.

Figure 11:
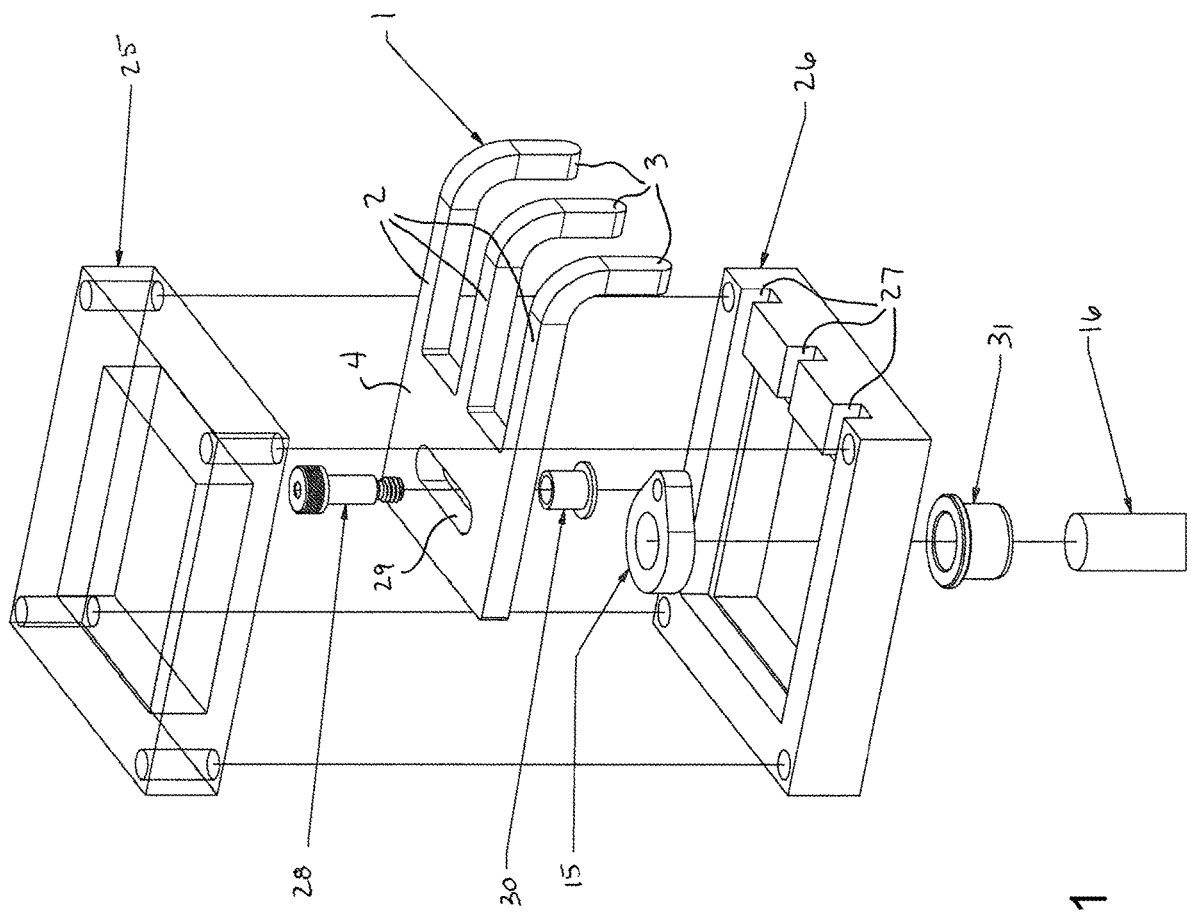
FIG. 11 schematically represents an exploded view of an embodiment of a kit for converting a rotary agitation system to an oscillating agitation system.
Figure 12:
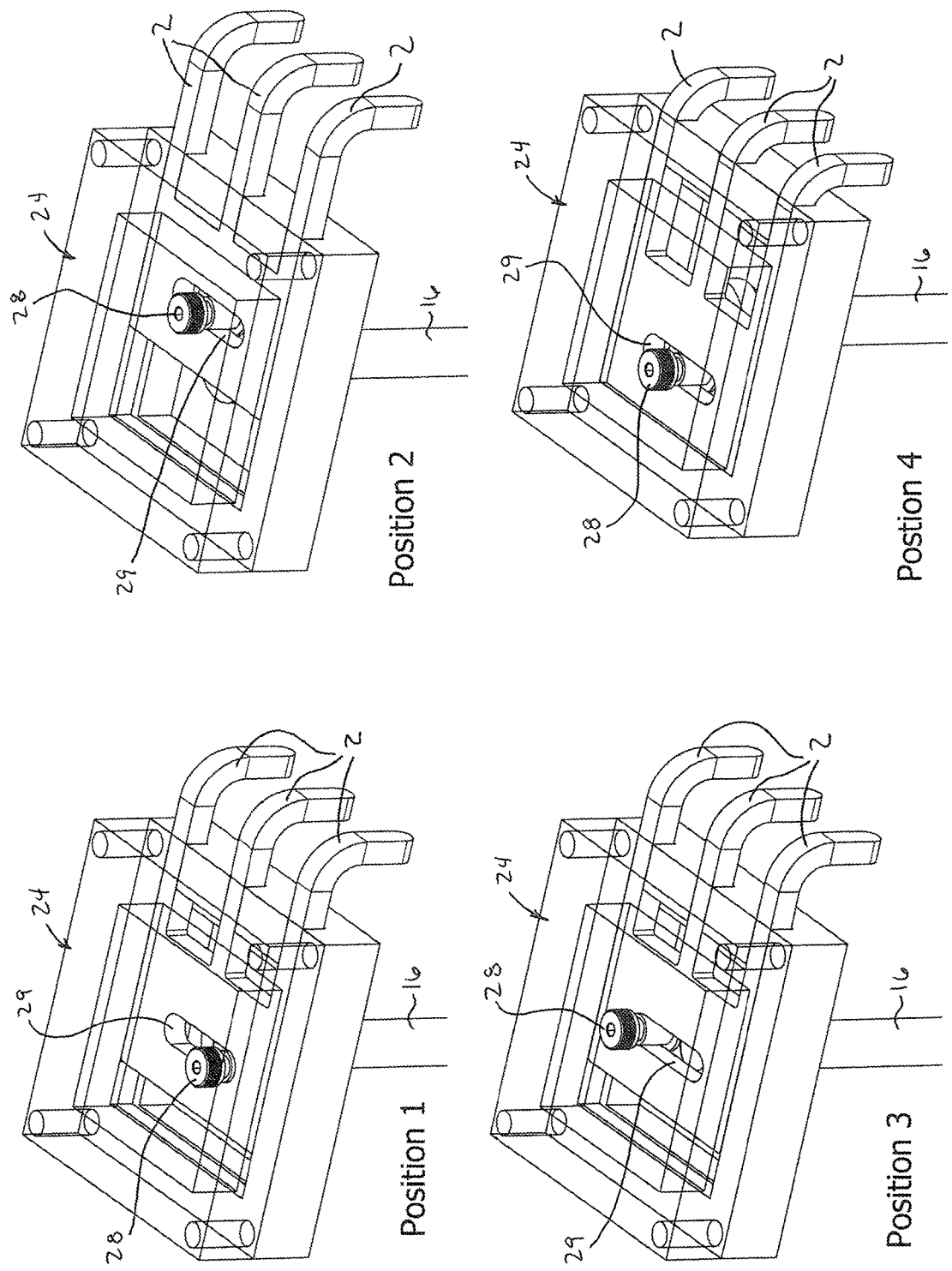
FIG. 12 contains four images that depict views showing the procession (Positions 1 through 4) of the agitation unit of FIG. 11 in action as a result of being coupled to the oscillating means.

As a nonlimiting example, FIGS. 11 and 12 represent an agitation unit 1 enclosed in a housing 24 (FIG. 13) formed by attaching a cover 25 to a guide block 26. Together, the cover 25 and guide block 26 define a cavity in which a hub 4 of the agitation unit 1 is contained, and from which arms 2 of the agitation unit 1 project through windows 27 of the housing 24. The agitation unit 1 is coupled to a rotating cam 15 that is coupled to a drive shaft 16, for example, the drive shaft 16 of the impeller 9 of FIG. 2, for rotation therewith. The agitation unit 1 may be coupled to the cam 15 with a cam bolt 28, which passes through a slot 29 in the hub 4 of the agitation unit 1 before being threaded or otherwise attached to a lobe of the cam 15. As such, the slot 29 is an equivalent to the cam follower 13 of the cam coupling units 11 of prior embodiments, and in combination the cam bolt 28 and slot 29 constitute a cam coupling unit that couples the agitation unit 1 to the cam 15. Friction between the cam bolt 28 and hub 4 and between the drive shaft 16 and guide block 26 is represented as being reduced with bushings 30 and 31, though other bearing means are foreseeable. To prevent contamination of the moving parts, seals (not shown) are foreseeable. The agitator unit 1, its housing 24, the cam 15, and various other components can be installed as original equipment on a spreader or sold and installed as a retrofit kit to convert a rotating agitation system of dispensing equipment (such as a broadcast rotary spreader) to an oscillating agitation system.

Figure 13:
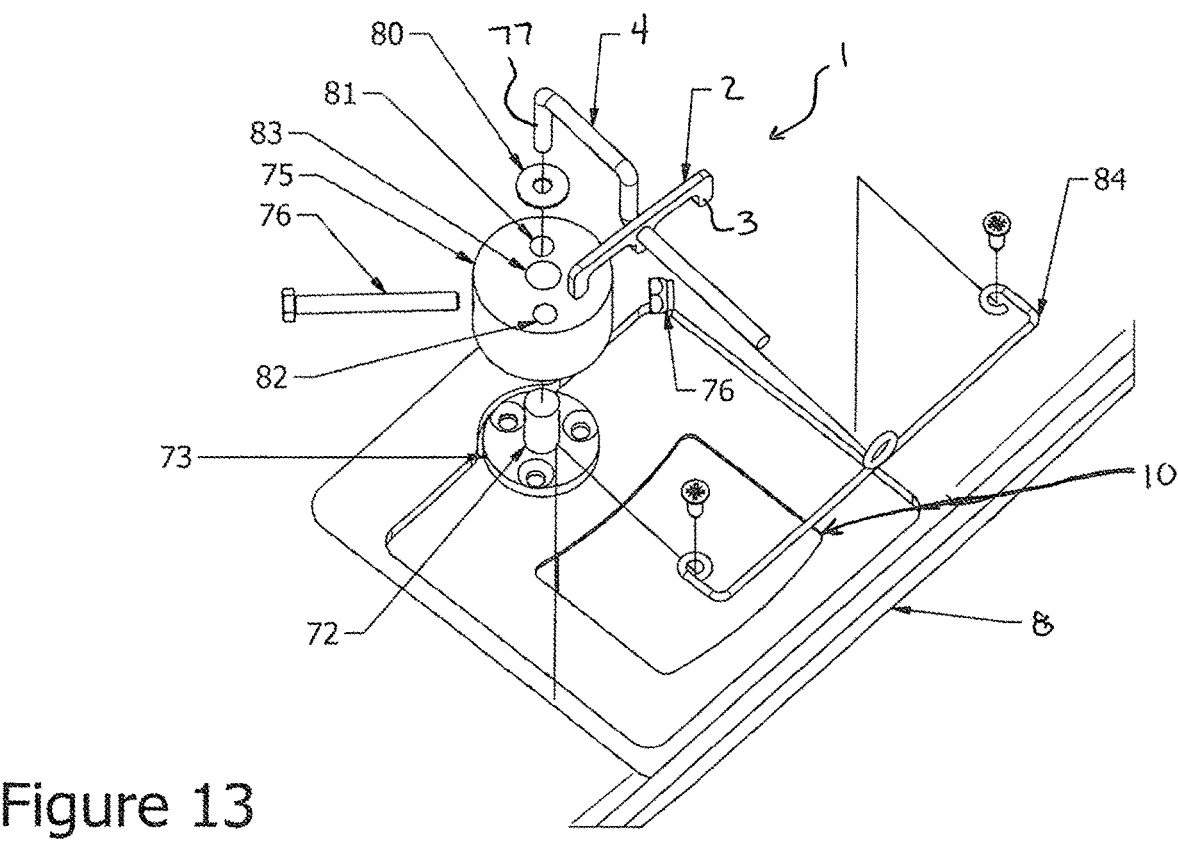
FIGS. 13 and 14 schematically represent exploded and assembly views, respectively, of components of a kit for converting a rotary agitation system to an oscillating agitation system.

Positions 1, 2, 3, and 4 of FIG. 13 depict the progression of the action of the agitation unit 1 caused by one revolution of the rotating cam 15. As the cam 15 rotates, the guide block 26 confines the motion of the agitator unit 1 within the housing 24 such that the rotational input of the cam 15 (and drive shaft 16) is converted into an orbital motion of the cam bolt 28, which through its interaction with the slot 29 transmits a linear oscillation to the agitation unit 1 that is parallel the arms 2, which in turn results in linear oscillatory motion of the arms 2 protruding from the guide block 26. As in prior embodiments, the downwardly-projecting extensions 3 are configured to an extent relative to the arm 2 and hub 4 to protrude into, but not through, the outlet passageways of a hopper (not shown) to break up any clogs or bridging of the material in the vicinity of the entrances to the passageways.

Figure 14:
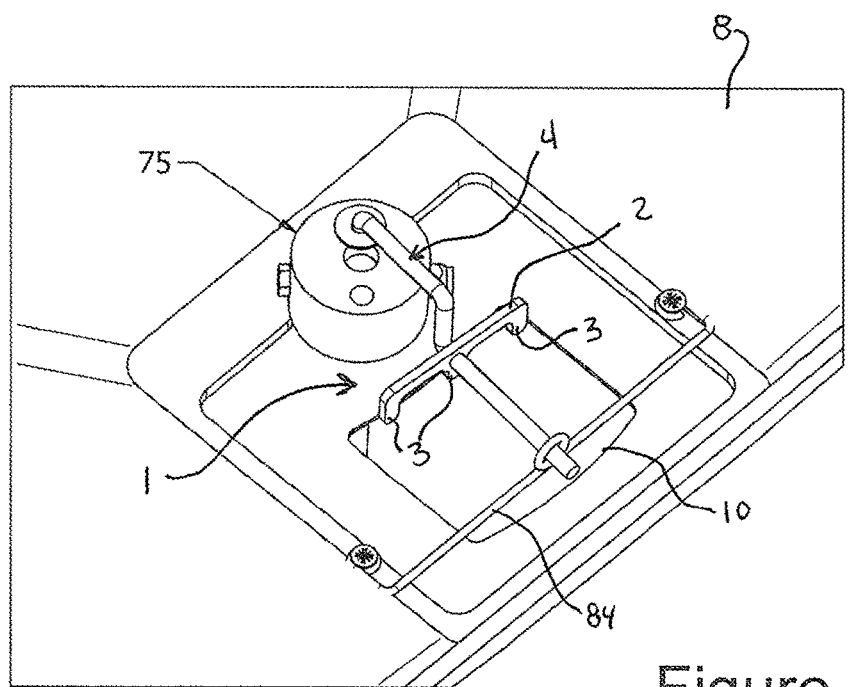
Figure 15:
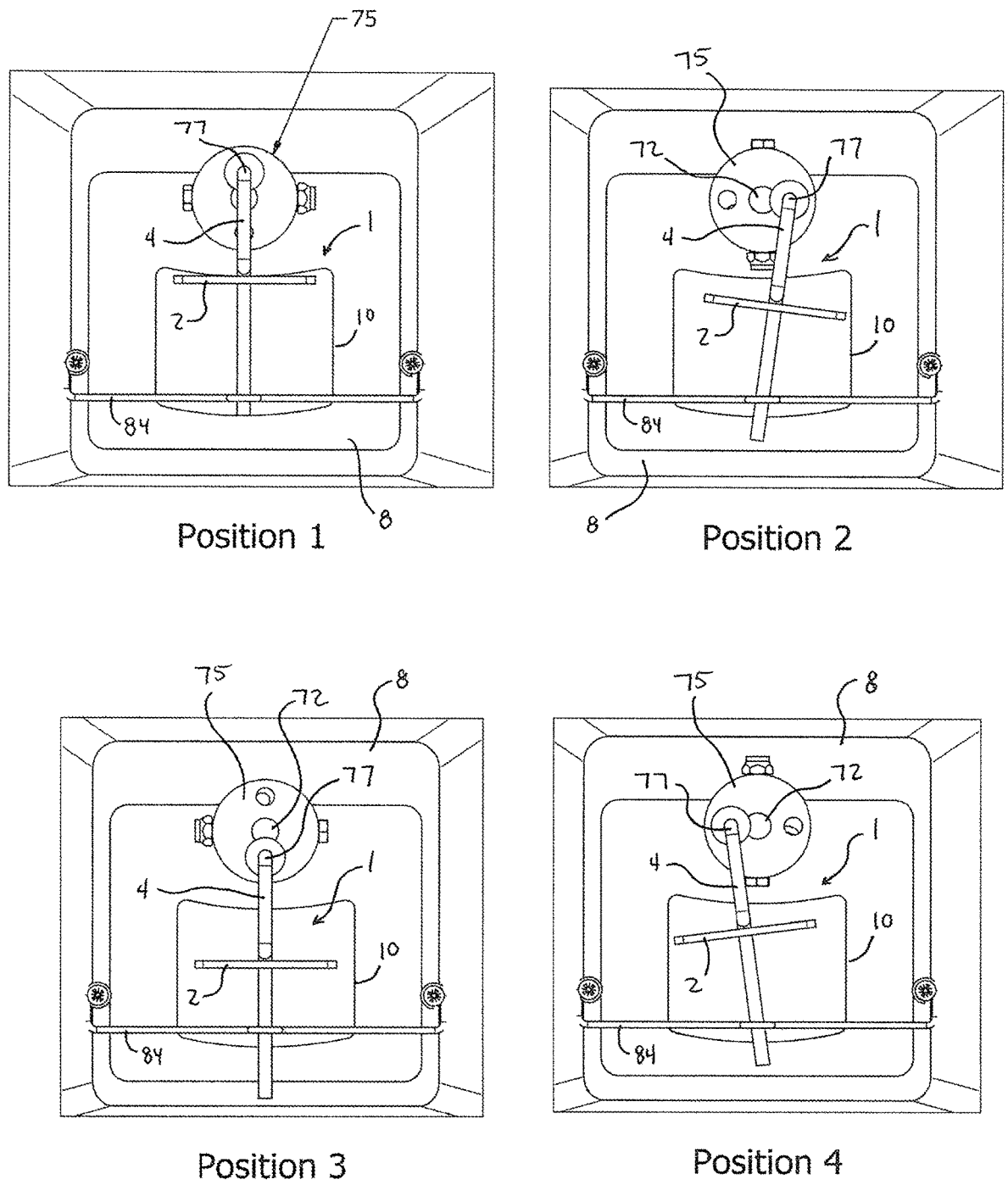
FIG. 15 contains four images that depict views showing the procession (Positions 1 through 4) of the oscillating agitation system of FIGS. 13 and 14 in action.

As another nonlimiting example of a retrofit kit, FIGS. 13 and 14 represent exploded and assembly views of a nonlimiting retrofit kit for converting conventional dispensing equipment, such as a broadcast rotary spreader, equipped with a rotating agitation system to an oscillating agitation system. Components of the kit disclosed in FIGS. 13 through 15 are shown installed in the bottom wall of a hopper 8 of the dispensing equipment in which a single outlet passageway 10 is present. A rotating drive shaft 72 of the rotating agitation system extends into the hopper 8 through a bearing 73 located in the bottom wall of the hopper 8. Similar to the drive shaft 16 of the oscillating agitation system discussed in reference to the embodiments of FIGS. 1 through 12, the shaft 72 may be a drive shaft of an impeller (not shown) of the dispensing equipment for rotation therewith. The upper end of the shaft 72 is received in a bore 83 in a cam 75 that is operably affixed to the shaft 72 by means of a bolt and nut 76. Other cam 75 and affixing means are foreseeable. An agitation unit 1 within the scope of the invention has a hub 4, a single arm 2 extending from the hub 4, and multiple downwardly projecting extensions 3 on the arm 2. Other configurations for the hub 4, arm 2, and extensions 3 are foreseeable. The extensions 3 may, but are not required to, project downwardly to an extent relative to the arm 2 and hub 4 to extend into the outlet passageway 10. The arm 2 is mounted on and extends laterally from a wire that functionally serves as the hub 4 of the unit 1. The arm 2 is in operable communication with the cam 75 as a result of a leg 77 of the hub 4 passing through a washer 80 and then being received in a cam hole 81 in the cam 75, which preferably has multiple cam holes 81 and 82 that are offset different distances from the rotational axis of the cam 75 (coaxial with the bore 83). According to one nonlimiting embodiment, the cam hole 81 is offset about ⅜ inch (about one centimeter) from the rotational axis of the cam 75 to deliver a ¾ inch (about 2 cm) oscillation when the cam 75 makes one revolution, and the second cam hole 82 is offset about 0.5 inch (about 1.3 cm) from the rotational axis of the cam 75 to deliver a 1 inch (about 2.5 cm) oscillation when the cam 75 makes one revolution. The washer 80 acts as a seal to prevent fertilizer accumulation within the holes 81 and 82. In combination, the leg 77 of the hub 4 and the offset cam holes 81 and 82 of the cam 75 constitute a cam coupling unit for the agitation unit 1. Other cam coupling units are also foreseeable.

The opposite end to the hub (wire) 4 passes through an opening in an agitator holder 84 which acts as a guide for the end of the hub 4 opposite the cam 75. The holder 84 can be suitably affixed to the hopper 8, for example, with screws as shown in FIGS. 13 and 14. The components of the retrofit kit, including the cam 75, arm 2, extensions 3, hub 4, and holder 84, are located inside the hopper 8.

Positions 1, 2, 3, and 4 of FIG. 15 depict the progression of the action of the agitation unit 1 of FIGS. 13 and 14 caused by one revolution of the shaft 72 and cam 75. As the cam 75 rotates, the cam coupling unit (constituted by the leg 77 of the hub 4 and the offset cam holes 81 and 82 of the cam 75) converts the rotational input of the cam 75 into an orbital motion of the leg 77, which transmits a predominantly orbital oscillating motion to the arm 2 whose extensions 3 to break up any clogs and bridging to promote the flow of granular material from the hopper 8 through the passageway 10. As part of a retrofit, the extensions 3 may or may not protrude into the outlet passageway 10 depending on the particular design requirements of the agitation system.

It is foreseeable that the kits represented in FIGS. 11 through 15 could also be configured to replace oscillating agitation systems of existing dispensing equipment, or installed as original equipment in new dispensing equipment.

It should be apparent that the agitation units 1 and their arms 2, extensions 3, and hubs 4 can be constructed of a variety of materials, for example, stainless steels, composites, plastics, and combinations thereof. Furthermore, the agitation units 1 may be assembled in any suitable manner and configured in size and shape as may be required to fulfill the intended purpose of an oscillating agitation system. It should be evident that the arms 2 and their extensions 3 can be fixed, adjustable, removable, replaceable, extendable, retractable, and/or orientated in numerous ways to provide a desired level of agitation. It should also be apparent that various alternative means of creating and transmitting motion to the agitation units 1 are envisioned, particular but nonlimiting examples of which include electrically powered solenoids and vibrators.

The agitation units 1 described above are preferably capable of reducing abrasion of dry granular materials broadcast by dispensing equipment equipped with oscillating agitation systems. The oscillating extensions 3 of the agitation units 1 protrude into, but not through, their respective outlet passageways 10 to more effectively loosen bridged particles and break up clumps of particles for discharge through the outlet passageway. As such, the agitation units 1 are capable of offering significant advancements in spreader technology and delivering superior flow-through of granular material with less clogging and better results.

While the invention has been described in terms of specific or particular embodiments, it is apparent that other forms could be adopted by one skilled in the art. For example, the agitation units, oscillating agitation systems, and various components of the dispensing equipment represented in the drawings could differ in appearance and construction from the embodiments described herein and shown in the drawings, functions of certain components could be performed by components of different construction but capable of a similar (though not necessarily equivalent) function, and various materials could be used in the manufacturing of the agitation units and oscillating agitation systems. Accordingly, it should be understood that the invention is not limited to any embodiment described herein or illustrated in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. An oscillating agitation system for use in dispensing equipment comprising a hopper, an impeller located beneath the hopper and operable to spread a dry granular material deposited on an upper surface thereof, an outlet passageway in the hopper through which the granular material drops from the hopper onto the impeller, and a rotating shaft, the oscillating agitation system comprising:
   a cam on the rotating shaft;
   an agitation unit comprising a hub, an arm extending from the hub, and an extension of the arm configured to project downwardly to an extent relative to the arm and the hub to protrude into, but not through, the outlet passageway of the hopper; and
   a coupling unit for coupling the arm to the cam, the coupling unit converting a rotational motion of the cam into a clockwise and counter-clockwise oscillating motion of the extension in counter-clockwise and clockwise directions about the axis of the rotating shaft, the oscillating motion of the extension occurring only within the outlet passageway.

2. The oscillating agitation system according to claim 1, wherein the agitation unit is a member of a unitary, one-piece article comprising the hub, the arm, and the extension.

3. The oscillating agitation system according to claim 2, wherein the unitary, one-piece article further comprises means for fastening the agitation unit to the rotating shaft.

4. The oscillating agitation system according to claim 1, wherein the arm is removably, replaceably, and repositionably installed in the hub.

5. The oscillating agitation system according to claim 1, wherein the arm is one of a plurality of arms each extending in a generally radial direction from the hub.

6. The oscillating agitation system according to claim 1, wherein the arm is one of a plurality of arms extending in parallel from the hub.

7. The oscillating agitation system according to claim 1, wherein the coupling unit is configured to convert the rotational motion of the cam into the clockwise and counter-clockwise oscillating motion of the extension within the outlet passageway.

8. The oscillating agitation system according to claim 7, wherein the coupling unit comprises a cam follower shaft to which the hub of the agitation unit is mounted and a cam follower in operable communication with the cam so that the rotational motion of the cam causes the cam coupling unit and the agitation unit to oscillate.

9. The oscillating agitation system according to claim 1, wherein the oscillating agitation system is installed on the dispensing equipment so that the extension on the arm protrudes into, but not through, the outlet passageway of the hopper and a rotational motion of the cam is converted into an oscillating or orbital motion of the extension within the outlet passageway.

10. A dispensing equipment comprising a hopper, an impeller located beneath the hopper and operable to spread a dry granular material deposited on an upper surface thereof, an outlet passageway in the hopper through which the granular material drops from the hopper onto the impeller, a rotating shaft, and an oscillating agitation system comprising:
   a cam on the rotating shaft;
   an agitation unit comprising a hub, an arm extending from the hub, and an extension of the arm; and
   a coupling unit for coupling the arm to the cam, the coupling unit converting a rotational motion of the cam into a clockwise and counter-clockwise oscillating motion of the extension in counter-clockwise and clockwise directions about the axis of the rotating shaft, the oscillating motion of the extension occurring only within the outlet passageway;
   wherein the extension projects downwardly to an extent relative to the arm and the hub to protrude into, but not through, the outlet passageway of the hopper.

* * * * *